Patented Mar. 7, 1939

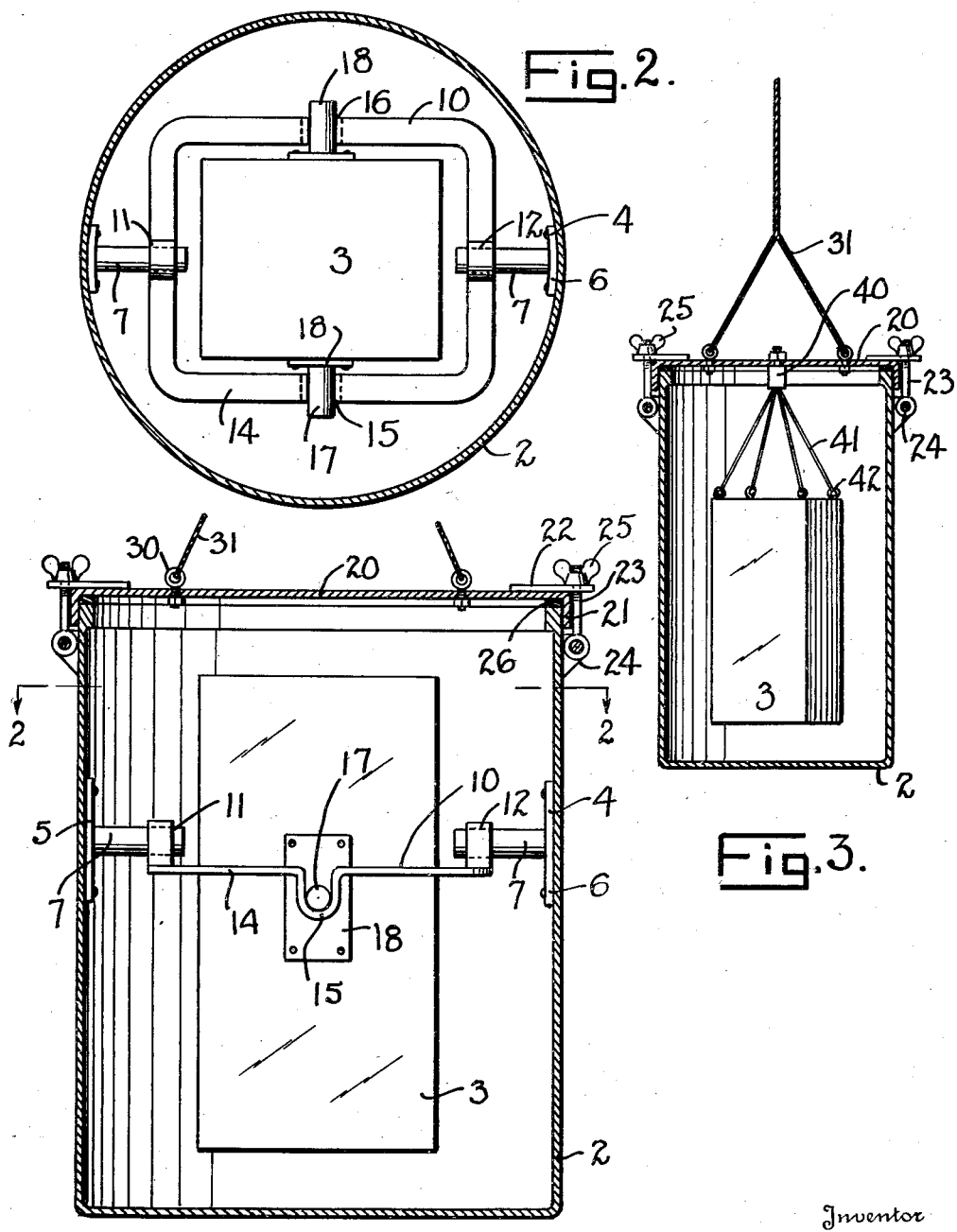

2,149,953

UNITED STATES PATENT OFFICE 2,149,953

AUTOMATIC LEVELER FOR GRAVITY MEASURING INSTRUMENTS

August K. Birnbaum, Houston, Tex., assignor of one-half to Horton C. Cockburn, Houston, Tex.

Application March 2, 1936, Serial No. 66,626

2 Claims. (Cl. 265—1.4)

The invention relates to an improvement in automatic levelers for gravity measuring instruments. Various types of gravity measuring instruments such as the torsion balance and the gravity meter have been devised in order to measure the gravimetrical pull occurring at various portions of the earth's surface and instruments of this type are now being utilized for the purpose of subsurface prospecting to determine the location of valuable deposits.

In the use of such instruments it is imperative that the instruments be maintained in a precisely level position in order to obtain accurate recordings. It has been the practice in the past to build a suitable foundation or platform for such instruments prior to setting up the instrument for use. In localities where there are swamps, as well as in bodies of water of any depth, it has been found to be very difficult to provide suitable foundations or platforms except at a prohibitive cost and with a great deal of delay.

The present invention has particular adaptation to the use of gravity measuring instruments in the prospecting for oil and gas formations. A majority of this work being carried on at the present time is along the southern boundary of the United States in more or less swampy and water covered sections so that the building of platforms is not only tedious and expensive, but it is next to impossible in a majority of instances. With this in mind the present invention has been devised with a view of providing a support for a gravity measuring instrument wherein the instrument will be automatically leveled.

It is one of the objects of the invention to provide an automatic leveler for gravity measuring instruments so that the building of a platform or support for the instrument is avoided.

Another object of the invention is to provide a combination container and support for a gravity measuring instrument so that the same may be lowered through a body of water and deposited upon the earth's surface in order to obtain the desired readings.

Another object of the invention is to provide a sealed container for a gravity measuring instrument so that the same may be immersed in a body of liquid in order to obtain a recording.

Still another object of the invention is to provide a universally pivoted mounting for a gravity measuring instrument so that it may automatically level itself regardless of any inclination of said support.

Other and further objects of the invention will be readily apparent when the following description is considered in connection with the accompanying drawing wherein:

Fig. 1 is a vertical sectional view illustrating the combination container and support with the gravity measuring instrument therein.

Fig. 2 is a transverse sectional view taken on the line 2—2 of Fig. 1 and looking down on the instrument.

Fig. 3 is a vertical sectional view of a modified form of the invention.

A container is illustrated generally at 2 and may take any size, shape or configuration so long as it has sufficient strength to serve as a support for a gravity measuring instrument indicated generally at 3. One type of container may be one constructed of metal so that it may have the brackets 4 and 5 attached thereto on opposite sides thereof. These brackets have a base piece 6 and a stub shaft 7 extending laterally therefrom. This shaft is in turn arranged to support a frame 10 which may take any desired configuration in order to surround the instrument 3.

As here shown, a rectangular frame has been provided and this frame is constructed with the bearing portions 11 and 12 on the opposite ends thereof in order to be received upon the shafts 7. These bearing portions 11 and 12 are formed by curving the frame 10 so that it will fit over the shaft 7 and will be free to rock on the shafts. In this manner a tilting movement about the shafts 7 as an axis is obtained.

The side portions 14 of the frame 10 are also formed with bearings 15 and 16 which are on opposite sides. These bearings are formed by curving the frame 10 and are arranged to receive the trunnions 17 and 18 which are fixed to the instrument 3 by means of the plates 18. This allows the instrument to tilt about the studs 17 and 18 as an axis so that a universal mounting has been provided for the instrument.

It seems obvious that the instrument will automatically seek a level or vertical position regardless of the inclination at which the container is positioned, because of the universal mounting for the frame 10 and the instrument 3 in the frame. It will be understood that the center of gravity of the instrument 3 is below the pivots so that the instrument will swing by gravity to a vertical position.

It has been found in practice that the prospecting work can be increased many fold by using an instrument which is mounted in this manner, because the container 2 can be transported readily and merely positioned on the earth's surface in order to obtain a reading.

It has been the practice in the past to build a considerable platform or foundation to receive the instrument and to then position a tent or other enclosure about the instrument to keep off any vibration due to wind forces and to eliminate as much interference as possible.

The present container accomplishes all the purposes of both the platform and the tent in the previous practices and can permit the taking of a reading within a very short period of time after the container is deposited on the earth's surface.

Where conditions permit, the container 2 can be used in the manner described but under other circumstances it is desirable to close the top of the container to exclude vibration or other disturbances, and with this in mind a cover 20 has been provided. This cover has a downwardly extending flange 21 and extending lugs 22 which are arranged to receive the pivoted bolts 23 carried by the brackets 24 on the side of the container 2. Wing nuts 25 are provided on the bolts 23 in order to anchor the cover securely in position and if desired a seal such as the packing or gasket 26 may be provided around the top of the container 2 in order to insure a complete seal. The instrument can be set and deposited in position and the cover 20 secured. The container can then be positioned on the earth's surface and the recordings accomplished.

Under some conditions it is desirable to obtain recordings from the bottom of a body of water such as a pond, lake, or bay, and with this problem in mind the container 2 is completely sealed and may have suitable eye-bolts 30 carried by the cover portion 20 in order to receive a rope or cable 31. In this manner the instrument can be immersed in the water and lowered to the bottom in order to obtain the desired recordings.

Fig. 3 shows a slightly modified form in which the instrument 3 has been supported from a swivel connection 40 carried by the cover 20. The support rods or cables 41 are fixed to the instrument by the eye-bolts 42 and the instrument is free to swing to a level position inside of the container when the container is slightly tilted. The cable 31 is shown attached to different forms of the invention so that it may be lowered through a body of water if desired.

Broadly the invention contemplates an automatic leveler for gravity measuring instruments which can be used in combination with a sealed container to permit the taking of recordings in a body of water, and contemplates that the instrument may be suitably supported to seek a gravitational level.

What is claimed is:

1. Apparatus for making geophysical measurements upon shallow water covered areas of the earth's surface which comprises a torsion balance and a container therefor, means in said container for supporting said balance for tilting movement so that the instrument will seek a gravitational level, means to seal said container whereby the container may be immersed and deposited upon the earth's surface in a submerged area and recordings of gravity measurements obtained, and additional means attached to said container to lower and retrieve the container.

2. The combination with a gravitational instrument of a support therefor including a gimbal joint arrangement so that the instrument may adjust itself due to gravity so as to reside in a vertical position, a protective shield carrying said support and completely enclosing said meter so as to exclude water when the meter is submerged and to also isolate the instrument from movement of the water, and means to lower and retrieve the shielded instrument through the water.

AUGUST K. BIRNBAUM.